United States Patent [19]
Courtright

[11] 3,799,582
[45] Mar. 26, 1974

[54] WHEELED CRADLE STRUCTURE FOR USE WITH AGRICULTURAL WHEEL LINES

[75] Inventor: Burr Courtright, La Grande, Oreg.

[73] Assignee: CH₂O, Inc., La Grande, Oreg.

[22] Filed: Nov. 22, 1972

[21] Appl. No.: 308,803

[52] U.S. Cl.................... 280/408, 280/63, 280/79.1, 280/400, 280/415 R, 280/179 R
[51] Int. Cl.............................................. B60d 1/14
[58] Field of Search....... 280/408, 415 R, 63, 47.15, 280/400, 79.1, 34 A

[56] References Cited
UNITED STATES PATENTS

| | | |
|---|---|---|
| 2,639,926 | 5/1953 | Parks .............................. 280/47.15 |
| 3,147,871 | 9/1964 | Rogers .............................. 214/506 |
| 3,377,085 | 4/1968 | Fralick .............................. 280/408 |
| 3,437,353 | 4/1969 | Lange .............................. 280/415 R |
| 2,822,184 | 2/1958 | Smith .............................. 280/63 |

Primary Examiner—Leo Friaglia

[57] ABSTRACT

A wheeled cradle useful in transporting agricultural wheel lines to new irrigation locations. The cradle includes spaced means for supporting the wheels of agricultural irrigation lines or "wheel lines," as they are called. The cradle structure depends from the rotation axis of the wheels so that the cradle structure is properly disposed downwardly and in a horizontal plane. Linkage arms extend laterally from the cradle structure and are constructed for coupling to similar units. A keeper member and associated structure are provided to lock the wheel of a wheel line within the supporting cradle.

10 Claims, 3 Drawing Figures

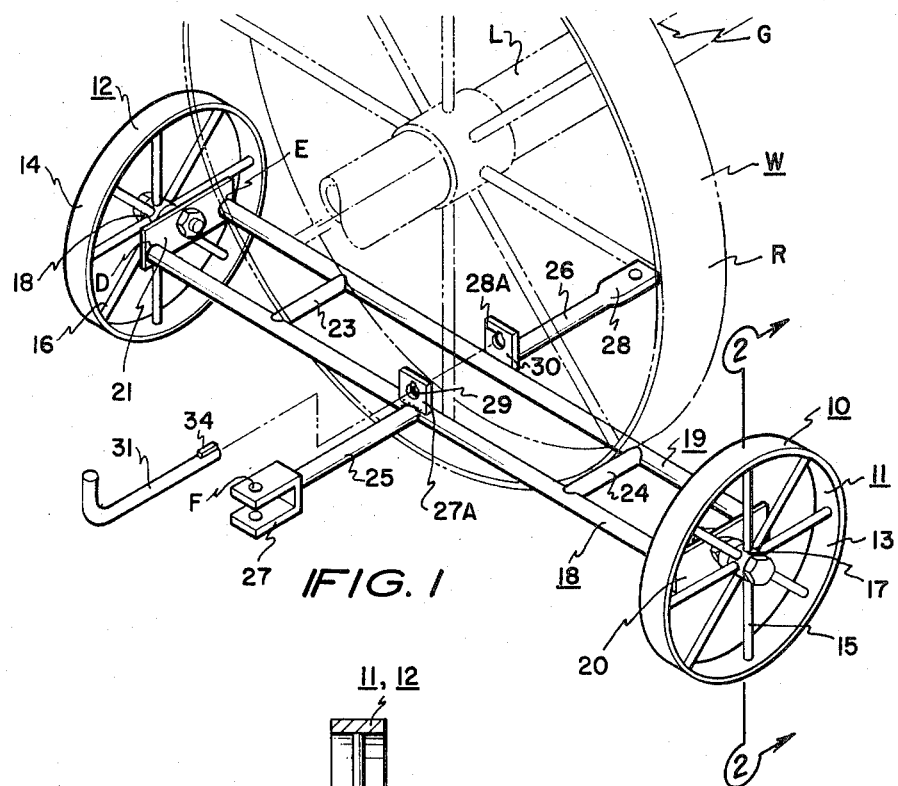
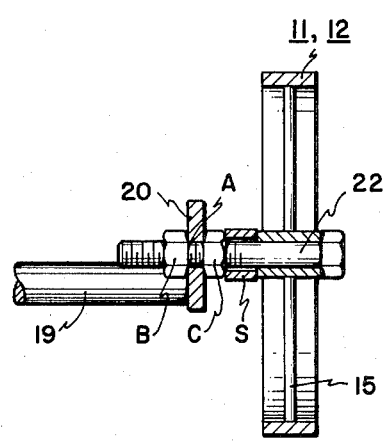
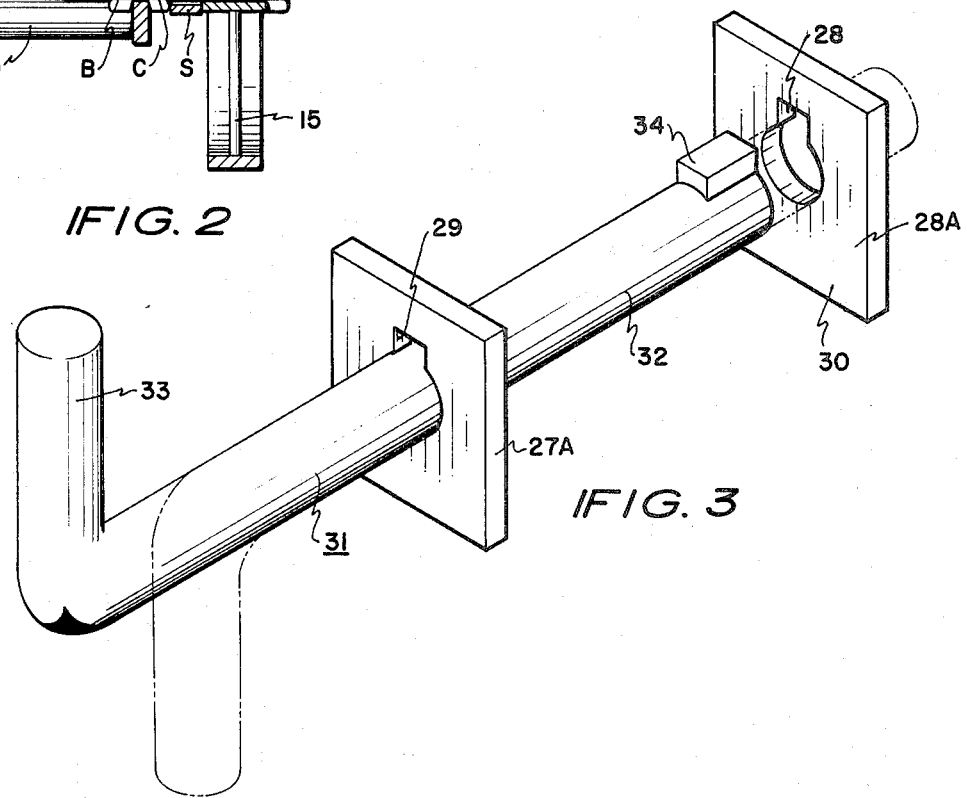

WHEELED CRADLE STRUCTURE FOR USE WITH AGRICULTURAL WHEEL LINES

The present invention relates to devices useful in transporting agricultural wheel lines and, more particularly, to a new and improved cradle structure for temporarily supporting the wheels of such wheel lines such that the line may be moved longitudinally along its axis to a new irrigation location.

Agricultural wheel lines are well known in the art and are used for irrigation purposes in lieu of underground systems. A "line" includes supporting wheels journaled to or simply carrying an elongate pipe. Water delivery systems such as revolving sprinklers are supplied and are supported by risers or stub conduit secured to the line to which a delivery hose is connected. As the wheel line moves, either by a water driven or an externally driven prime mover, the wheel line advances over the field to be irrigated. Once a given path has been traversed it is no simple matter to translate the wheel line length along its longitudinal axis so that a shifted return travel path can be obtained for subsequent wheel line movement.

The present invention comprises a cradle structure which is used to supportingly engage a wheel of a wheel line. It is contemplated that several of such cradle structures will be utilized to support all of the wheels of the line. Each cradle will be supplied with opposite wheels such that the wheel line can be carried or translated along its longitudinal axis.

Thus, the present invention comprises a cradle structure which by its design is assured nominal disposition in a horizontal plane. The cradle structure is supported by and journaled to its wheels and also includes supporting bars for supporting a representative wheel of an agricultural wheel line. Pivot connections extend laterally from the cradle structure such that similar constructions may be pivotally attached thereto. This is desirable in order that a series of such cradles may be pivotally secured together and hauled or towed as by a tractor to a given field of location.

Keeper structure is provided so as to insure that the wheel of a given wheel line can be locked into the cradle construction on a temporary basis. The keeper structure is designed with suitable keyway accommodating means such that when the keeper drops under the force of gravity, by virtue of its laterally disposed handle portion, no inadvertent jarring will release the lock relative to the wheel.

Of particular importance in a preferred embodiment of the invention is the provision of the cradle structure as disposed beneath the axis of rotation of the cradle wheels. This insures proper horizontal alignment of the cradle structure for desired use.

Accordingly, a principal object of the present invention is to provide new and improved cradle structure for the individual wheels of wheel lines, used for agricultural irrigation purposes.

A further object is to provide a wheeled supporting device for the wheels of agricultural wheel lines.

An additional object is to provide a wheeled cradle structure for agricultural wheel lines, the cradle structure being designed to have a center of gravity beneath the axis of the wheels carried by the same.

A further object is to provide towing means accommodating pivotal connection of a number of the subject cradle devices.

A further object is to provide a keeper which can be used to releasably lock the wheel of an agricultural wheel line within the supporting cradle of the invention.

The features of the present invention may best be understood by reference to the following description taken in connection with the accompanying drawings in which:

FIG. 1 is a perspective view, partially exploded, of a wheeled cradle device constructed as a preferred embodiment of the invention; for convenience of illustration the wheel of the wheel line to be supported thereby is shown in phantom line.

FIG. 2 is an enlarged vertical section taken along the line 2—2 in FIG. 1.

FIG. 3 is an enlarged perspective view of certain keeper structure which may be incorporated in the invention to lock the wheel of an agricultural wheel line in position on a temporary basis; in FIG. 3 the phantom line condition of the handle illustrates the way the keeper member automatically rotates so as to place the keyway means out of alignment.

In FIG. 1 the device 10 of the present invention is shown to include a pair of wheels 11 and 12, each having outer rims 13 and 14, plural spokes 15 and 16, and hubs 17 and 18 integrally related therewith. The particular design of these wheels is of no particular importance and standard wheels are currently found on the market suitable for the purposes intended.

Crossbars 18 and 19 may be rods, solid or tubular, and are welded at their opposite ends to respective plates 20 and 21 as shown. Each of these plates include an aperture A for receiving a respective bolt axle 22. The latter is secured in place by nuts B and C, such that the respective wheels 11 and 12 may be appropriately journaled. Bushings or spacers S may likewise be employed.

It is important to note that the ends of crossbars 18 and 19 are welded at representative points D and E which are below aperture A. This insures that the cradle will depend, or be suspended downwardly from the pivot axes of the respective wheels, and hence assume a stabilized horizontal condition.

Supporting bars 23 and 24 are welded in transverse disposition relative to crossbars 18 and 19 and are constructed for the supporting of rim R of a conventional wheel W of wheel line L, all shown in phantom lines.

The structure by which the wheel R is maintained in position is shown in FIGS. 1 and 3. Thus, tow bars 25 and 26 are provided with pivot connection ends 27 and 28 each including apertures F as indicated. These bars are for the purpose of towing a series of such cradle devices 10 when the same are hooked together as by vertical pivot pins disposed through the respective apertures F.

Upstanding plates 27A and 28A include keyhole apertures 29 and 30 constructed to receive retainer bar 31 of FIG. 3. The bar includes an elongate portion 32 and also a handle portion 33 integral therewith and oriented in 90 degree disposition relative thereto. A keeper bar 34 designed to accommodate the respective keyhole slots 28 and 29 is welded or otherwise fixed to member 31.

Thus, when the member 31 is inserted as indicated, the handle 33 will drop downwardly and the keeper 34 as well, thereby releasably securing the wheel R to the cradle. Thus, as the cradle moves along its wheels, the wheels R of the wheel line will not tend to be displaced or jar upwardly and outwardly of the cradle as formed by bars 23 and 24.

What is provided, hence, is a novel wheel cradle structure for wheel lines such that the same may be transported longitudinally along the axis G of the respective wheel line.

In operation, the structure of FIGS. 1–3 illustrates that a wheel may be lifted and implaced as seen in FIG. 1 such that the lower portion of the rim R is disposed above the ground plane. The keeper member 31 is installed so that the wheel line wheel will not tend to jump out or be jarred out of its cradle. Subsequently, the wheel line may be transported suitably along the axis of the wheel line such that the same may assume a new location at right angles to the normal direction of travel of the wheel line.

Clevis or pivot connections, as shown, are utilized so that a series of the cradles may be attached and pivoted together for suitable combined transport to desired field locations.

While particular embodiments of the invention have been shown and described, it will be obvious to those skilled in the art the various changes and modifications which may be made without departing from the essential features of the present invention and, therefore, the aim in the appended claims is to cover all such changes and modifications as fall within the true spirit and scope of the invention.

I claim:

1. A cradle structure for supporting, for axial longitudinal movement, a representative wheel of an agricultural irrigation wheel line, said cradle structure including, in combination, a cradle frame having mutually spaced, transverse, parallel wheel-supporting portions and being constructed to define an open, unobstructed area between said supporting portions, and a pair of wheels disposed on opposite sides of and journaled to said frame and spaced outwardly of said supporting portions.

2. Structure according to claim 1 wherein said cradle structure includes a pair of end plates upstanding from opposite ends of said cradle frame, said pair of wheels being respectively journaled to said plates at points above said wheel supporting portions.

3. Structure according to claim 1 wherein said cradle structure includes elongate rigid means for locking through an external wheel of a wheel line in position within said cradle when disposed upon said wheel-supporting portions.

4. A cradle structure for supporting, for axial longitudinal movement, a representative wheel of an agricultural irrigation wheel line, said cradle structure including, in combination, a cradle frame having mutually spaced wheel-supporting portions, and a pair of wheels disposed on opposite sides of and journaled to said frame and spaced outwardly of said supporting portions, said cradle structure including means for locking an external wheel of a wheel line in position within said cradle when disposed upon said wheel-supporting portions, said retaining means comprising a keeper member having an upstanding keyhole portion, said frame including keyhole slot means for receiving said keeper member said keeper member including an angulated handle.

5. A cradle structure for supporting, for axial longitudinal movement, a representative wheel of an agricultural irrigation wheel line, said cradle structure including, in combination, a cradle frame having mutually spaced wheel-supporting portions, and a pair of wheels disposed on opposite sides of and journaled to said frame and spaced outwardly of said supporting portions, said frame including a pair of mutually spaced, horizontal elongate bars, a pair of plates secured to said bars at opposite ends thereof, a pair of spaced medial bars transversely secured to and between said elongate bars, said wheels being journaled to said plates at respective positions above said elongate bars.

6. A cradle structure for supporting, for axial longitudinal movement, a representative wheel of an agricultural irrigation wheel line, said cradle structure including, in combination, a cradle frame having mutually spaced, wheel-supporting portions, and a pair of wheels disposed on opposite sides of and journaled to said frame and spaced outwardly of said supporting portions, said cradle including a pair of outwardly, oppositely, and laterally extending hitch means, each of said hitch means having means for accommodating the vertically pivotal attachment of the ends thereof to adjacent cradle structures.

7. A cradle structure for supporting, for axial longitudinal movement, a representative wheel of an agricultural irrigation wheel line, said cradle structure including, in combination, a cradle frame comprising a pair of mutually spaced horizontal, parallel elongate bars transversely oriented in a direction parallel to the direction of intended progressive movement of said cradle structure, said cradle frame being constructed to provide unobstructed space between said bars, whereby to provide a receiving space volume for said representative wheel, a pair of plates secured to and upstanding from opposite ends of said bars, wheels journaled to said plates, and wheel line, wheel-supporting portions secured to and between said elongate bars and spaced inwardly of said wheels.

8. Structure according to claim 7 wherein said wheels are journaled to said plates at points above said elongate bars.

9. In combination, a cradle structure having a horizontal frame, and wheels journaled to said frame at opposite ends thereof, said horizontal frame including transverse wheel support elements and being constructed to provide unobstructed wheel-access space between said elements; and an irrigation wheel-line including horizontal water conduit and a support wheel circumferentially thereon, said support wheel being liftably, supportingly disposed on said support elements, said support elements being inwardly spaced from said wheels such that said irrigation wheel-line support wheel clears said wheels of said frame.

10. Structure according to claim 9, wherein said frame is constructed such that said wheel-access space in width is essentially equivalent to the width of said support wheel.

* * * * *